United States Patent

De Windt

[15] 3,672,699
[45] June 27, 1972

[54] AUTOMATIC RESTRAINT SYSTEM ARMING CONTROL

[72] Inventor: Edward Mandell De Windt, Lyndhurst, Ohio

[73] Assignee: Eaton Corporation, Cleveland, Ohio

[22] Filed: July 13, 1970

[21] Appl. No.: 54,353

[52] U.S. Cl. .................. 280/150 AB, 180/102, 200/85 A
[51] Int. Cl. ............................................ B60r 21/10
[58] Field of Search .............. 280/150 SB, 150 B; 296/84 K; 180/82, 104, 102; 340/278; 200/85

[56] References Cited

UNITED STATES PATENTS

| | | |
|---|---|---|
| 2,931,665 | 4/1960 | Sandor................................280/150 |
| 3,215,221 | 11/1965 | Rayman................................180/82 |
| 2,731,100 | 1/1956 | Butler.................................180/102 |
| 3,455,410 | 7/1969 | Wilson................................180/102 |
| 3,495,675 | 2/1970 | Hass et al..........................280/150 X |

Primary Examiner—Kenneth H. Betts
Attorney—Teagno & Toddy

[57] ABSTRACT

An occupant restraint mechanism which is mounted in a vehicle and automatically operable for restraining movement of the occupant relative to the vehicle in response to the vehicle being involved in a collision, including means for detecting the presence of an occupant and means for preventing operation of the restraint mechanism if no occupant is present to be restrained thereby.

7 Claims, 2 Drawing Figures

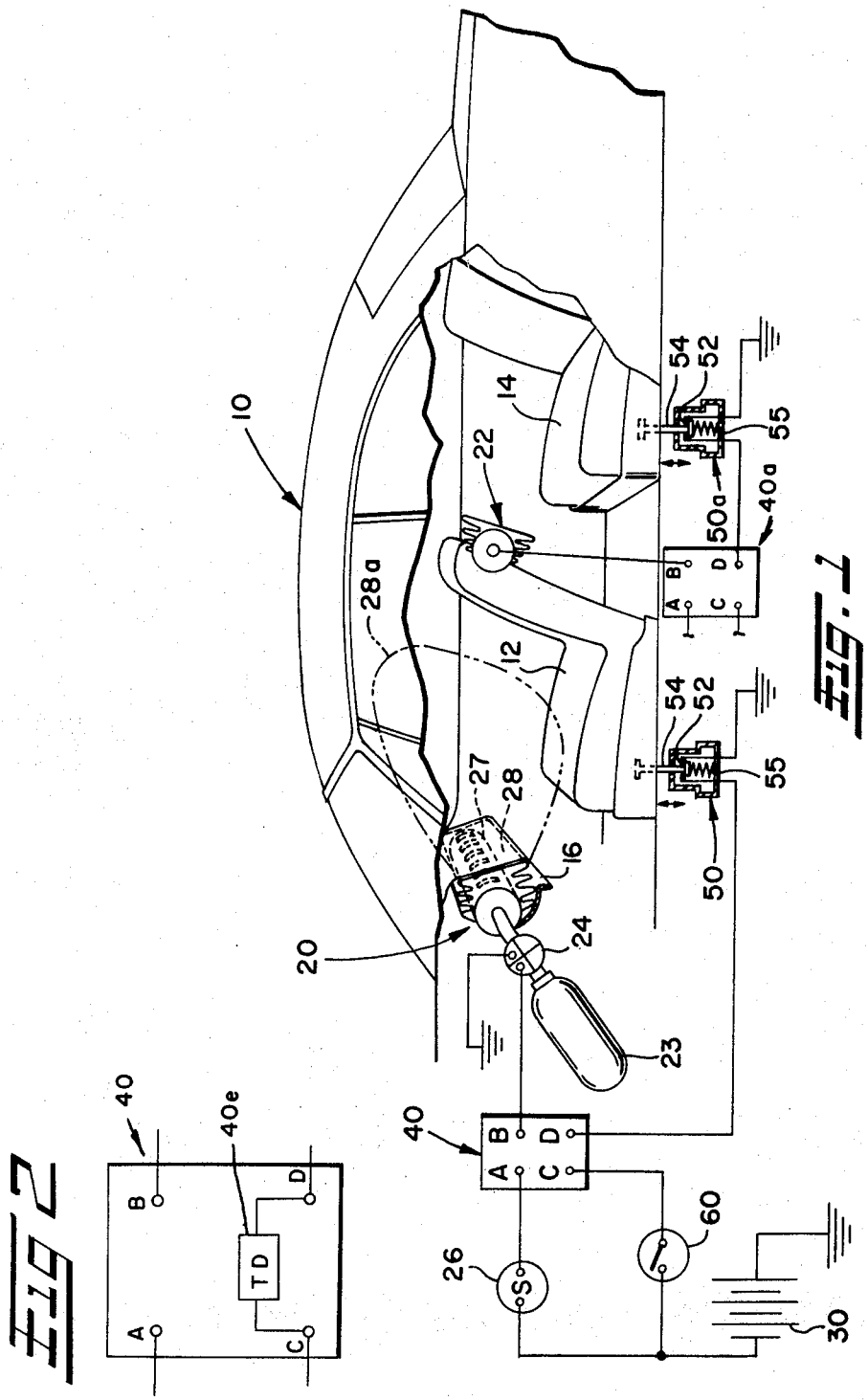

AUTOMATIC RESTRAINT SYSTEM ARMING CONTROL

BACKGROUND OF THE INVENTION

1. Field of Invention

The present invention relates to a vehicle safety apparatus for protecting an occupant of a vehicle during a collision. More particularly, the invention relates to a vehicle safety apparatus including a confinement for controlling and restraining movement of a vehicle passenger during a collision and having a contracted inoperative condition and an expanded operative condition. The confinement may be actuated to its expanded condition by a flow of fluid into the confinement in response to the vehicle encountering a collision condition.

2. Discussion of the Prior Art

Inflatable cushion occupant restraint systems for automotive vehicles are generally known in the art. Although previous inventors have developed inflatable cushion occupant restraint systems, none has devised an inflatable cushion occupant restraint system which is actuated during a vehicle collision only when an occupant is present and in a proper position, with respect the restraint system, to be restrained thereby. Thus, one of the problems of prior art devices has been that although only a driver is present in a vehicle, all of the cushions in the vehicle are inflated when the vehicle is involved in a collision. This happens whether the cushion restraints are located in a position to restrain the driver or not.

As anyone who observes traffic on a major highway will be aware, a large percentage of the vehicles carry only one occupant, that is the driver. The percentage of vehicles having more than one but less than a full capacity of occupants is even greater. Thus, when a multi-passenger vehicle having an inflatable cushion for each seating position is involved in a collision, many of the cushion restraints which are inflated in response thereto serve no useful purpose. Furthermore, in the case of a minor collision, the expense incurred in replacing these restraints can exceed the cost of repairing the damage to the vehicle actually caused by the collision.

Another problem of the prior art is that presented by the unrestrained child-occupant of a vehicle. This would be a child or toddler somewhere between two and five years of age. Tests have proven that in a vehicle collision if such a child is seated in the normal passenger seating position within the vehicle, he will be protected by the inflatable cushion. However, if he is standing next to the dashboard of the vehicle, and near the source of cushion inflating fluid as is many times the case, he may be injured by inflation of the cushion. This is due mainly to the fact that the child's mass is relatively low compared with the energy of the expanding cushion, consequently the child is propelled rearwardly by the expanding cushion. It may be better that, if the toddler standing next to the dash is allowed to "ride the car down" during the collision he may experience lower deceleration forces and more likely be protected from harm than if he were to be impacted by the expanding inflatable cushion and moved toward the rear of the car thereby. Indeed, if the child is allowed to remain directly against the dash when the collision occurs, he will be supported thereby and thus probably not experience the "second collision." The "second collision" is defined in the art as that portion of the accident which occurs when the occupant impacts a structural portion of the vehicle. The "second collision" is usually the cause of death or injury to the occupant and occurs only after the vehicle has been rapidly decelerated by colliding with some solid object.

Although the instant invention will disarm the automatic occupant inflatable cushion restraint system in the event that no passenger is present, the apparatus of the present invention must be fail-safe. That is, in the event of failure, the device must fail in a manner as to insure that the inflatable cushion is armed and ready to protect the occupant whether he is present or not. This is necessary in order not to effect a savings in property damage at the expense of increased risk to human life.

Accordingly, it is an object of my invention to provide an inflatable occupant restraint system wherein each seating position of the vehicle is protected by an inflatable cushion and wherein the cushion at a particular location in the vehicle is not inflated during a collision unless an occupant is present in that particular seating position to be protected thereby.

It is another object of this invention to provide in the inflatable cushion occupant restraint system described above a fail-safe mechanism which, if malfunction occurs, will automatically arm the restraint system to an operable condition regardless of the absence of properly positioned occupants.

It is a still further object of my invention to provide an automatically actuatable safety device having means for preventing actuation thereof if a child is standing adjacent thereto.

SUMMARY OF THE INVENTION

A logic mechanism which prevents actuation of an inflatable cushion occupant restraint system is incorporated into the system to prevent actuation when the system is not needed. The logic mechanism is designed to be fail-safe and may include a time delay feature which is incorporated to reduce potential non-critical impact interference with the inflatable cushion occupant restraint system function. In a preferred embodiment, the system comprises two switching mechanisms. The first switching mechanism is normally closed and operatively associated with the seat structure in a manner to be automatically opened when an occupant is seated therein. The second switching mechanism is also normally closed. When the first switch is closed and the ignition switch of the vehicle is turned on, a control device opens the circuit between the collision sensor and the inflatable occupant restraint system actuation means, thereby preventing actuation of the safety system. However, when a control device attached to the second switching mechanism is deactivated, such as by detection of the presence of a vehicle occupant, the second switching mechanism returns to its normally closed position. This completes the circuit between the collision sensor and the inflatable cushion occupant restraint system actuation means, thereby allowing the inflatable cushion occupant restraint system to be actuated by the collision sensor in response to the vehicle encountering a collision. The result is that the second switching mechanism must be acted upon by a power input to disarm the system or particular inflatable cushions thereof. The power input required is small and may be supplied by means of the first switching mechanism connected through the ignition switch of the vehicle. This arrangement renders the inflatable cushion occupant restraint system inoperable when the ignition switch of the vehicle is on and no occupant is present in the particular seating position protected by the inflatable occupant restraint system.

Conversely, if the first switching mechanism associated with the vehicle occupant seat is open by an occupant sitting in the seat, the power necessary to keep the second switching mechanism in the open position will be interrupted and the second switching mechanism will close thereby allowing the inflatable cushion occupant restraint system to be actuated by the collision sensing means. Also, if the ignition switch is off, the inflatable occupant restraint system is armed and operable to protect passengers who might be sitting in the parked vehicle.

In order to prevent the system from being deactivated if the occupant were jolted momentarily from his seat during the crash, a time delay mechanism is incorporated which will keep the second switching mechanism in a closed position for a predetermined time interval. This insures that the inflatable cushion occupant restraint system will be ready and operable when needed. Preferably, the second switching mechanism is positioned as close as possible to the inflatable cushion occupant restraint system and is assembled as an integral part of the total system, thereby reducing potential failure due to faulty wiring connections between the second switching mechanism and the system actuator. Since the second switching mechanism is of the normally closed variety, if for any reason power to the first switching mechanism should be lost or short circuited, the second switching mechanism would automatically ready the system for operation thereby preventing system failure and providing a fail-safe inflatable cushion occupant restraint system arming control.

Thus, the instant invention comprises an inflatable cushion occupant restraint system having a logic mechanism for detecting the presence of an occupant. Upon detection of an occupant, the instant invention supplies a signal to a device mounted in the circuit between the inflatable cushion occupant restraint system actuating mechanism and the power source therefor. The signal is acted upon by the device to arm the inflatable cushion for particular passenger positions within the vehicle.

Inflatable cushion occupant restraint systems comprise a fluid supply, means for actuating the fluid supply to supply fluid in response to a collision, and an inflatable cushion for receiving fluid from the source. The cushion is thereby expanded into position for restraining movement of the occupant, and absorbing and dissipating the occupant's kinetic energy resulting from movement of the occupant relative to the vehicle. Representative devices of this type are shown in the art in the following United States Letters Pats. Nos.: Bertrand 3,197,234; Zicardi 2,850,291; Oldberg and Carey 3,414,292; and Chute 3,481,625.

DESCRIPTION OF THE DRAWING

FIG. 1 is a longitudinal section view of a vehicle showing the invention of the instant application.

FIG. 2 is an enlarged view of the control mechanism of the instant invention.

DESCRIPTION OF THE PREFERRED EMBODIMENT

A preferred embodiment of the present invention is disclosed in FIG. 1 wherein there is shown: a vehicle passenger compartment 10 having a front seat 12 and a rear seat 14 disposed therein. As is shown in the drawing, the vehicle is sectioned down its center line, thus, only the right half or passenger side of the vehicle is shown for purposes of this invention. However, the invention would operate in exactly the same manner when applied to the driver's side of the vehicle.

The vehicle passenger compartment 10 has an inflatable cushion occupant restraint system 20 mounted in the dashboard 16 thereof. The system 20 is positioned so as to protect an occupant in the right front portion of the vehicle passenger compartment 10 during a collision. Mounted on the back of the front seat 12 is another inflatable occupant restraint system 22 which is positioned to protect an occupant in the right rear portion of the vehicle passenger compartment 10.

Since the invention is essentially identical for all occupant passenger positions within the vehicle, only the portion of the system for the right front passenger position will be described in complete detail.

The inflatable cushion occupant restraint system 20 comprises a reservoir 23 containing pressurized fluid, an electrically operated valve 24, a collision sensor 26, a distributor tube 27, and an inflatable cushion 28. A collision sensor satisfactory for use with this type of device is shown in pending United States Patent application, Ser. No. 753,948 filed Aug. 20, 1968, now U.S. Pat. No. 3,552,768, and assigned to the assignee of the instant invention.

Upon the occurrence of a vehicle collision dangerously high accelerations occur and cause the collision sensor 26 to supply a signal to valve 24 which is opened thereby. This allows the pressurized fluid from the reservoir 23 to inflate the cushion 28 to position 28a as shown in phantom in FIG. 1. The sensor 26 may be of various types but in the embodiment shown in FIG. 1 comprises an electrical switch which is actuated by the acceleration forces of the collision to supply an electrical signal for actuating the valve 24 by closing a circuit between that valve and the vehicle battery 30.

Included in the circuit between the collision sensor 26 and the valve 24 is control mechanism 40. One portion of the control mechanism 40, the portion between terminals A and B, is in series with the collision sensor 26. This allows control mechanism 40 to interrupt the electrical signal from collision sensor 26 in the event that a passenger sensing mechanism 50 indicates that no passenger is present in the right front passenger position.

The passenger sensing mechanism 50 can be any of many different types of detecting devices available in the art. Some of these devices are passenger body heat detectors, photo electric cells which detect light reflected from the passenger, mechanically actuated linkages or one of various other known detecting devices. However, for purposes of the preferred embodiment, I use a much more direct method of detecting the presence of an occupant.

Accordingly, the passenger sensing mechanism 50 comprises a switch 52 having a plunger 54 mounted beneath the cushion of the vehicle seat 12. In order to provide a failsafe system which will act in favor of inflating the cushion of the occupant safety system 50, I have provided switch 52 as being a normally closed switching mechanism and which is opened in response to the weight of an occupant sitting in the seat 12. Accordingly, a spring 55 is provided within passenger detecting mechanism 50 for biasing the plunger 54 and switch 52 to the switch closed position. The switch 52 is in series with terminals C and D of the control mechanism 40. The control mechanism 40, comprises a normally closed switching mechanism across terminals A and B. This switch is effective when closed, to complete the electrical circuit between the collision sensing mechanism 26 and the electrically operated valve 24 of the pressure reservoir 23. The normally closed switch across terminals A and B within the control 40 is opened in response to the flow of electrical current across terminals C and D of the control mechanism 40. As can be seen from FIG. 1, terminal C of control mechanism 40 is in series with vehicle ignition switch 60 and the vehicle battery 30. Also, as can be seen from FIG. 1, terminal D of control mechanism 40 is in series with the normally closed switching mechanism 52 to ground.

Included within the control mechanism 40 is a time delay mechanism 40e as shown in FIG. 2 which will prevent rapid opening of the normally closed switch mechanism between terminals A and B of control mechanism 40. The purpose of this time delay mechanism is to prevent the normally closed switching mechanism connected within control 40 between terminals A and B thereof from opening in response to transient impacts. Thus, if the occupant should be momentarily jolted from his seat during the collision, thereby allowing switch 52 to close, the time delay will keep the circuit across terminals A and B closed, thereby insuring operation of the occupant restraint.

The control mechanism 40 may also be of many types well known in the art. For example, suitable devices for use as control mechanism 40 are commercially available from Square D Co. of Parkridge, Illinois, known as Class 9050 type A01E delay on opening relay or from Magnecraft Electric Co. of Chicago, Ill., known as Class 110 Air Dashpot Time Delay Relay.

It should be noted that a separate control mechanism 40 and passenger detecting means 50 will be required for each occupant seating position or inflatable restraint system. For example the control mechanism 40a and seat switch 50a as shown in FIG. 1 for the right rear seat passenger seating position are identical in structure, function and electrical connections to the control 40 and seat switch 50 previously described with respect to the right front passenger seating position.

DESCRIPTION OF OPERATION

In the circuit, shown, passenger detecting mechanism 50 comprising a normally closed switch 52 is operatively associated with the seat 12 by means of plunger 54 so as to be opened by the presence of an occupant sitting in the seat 12. For example, as shown in FIG. 1, switch 52 and plunger mechanism 54 are mounted under the bottom of seat 12. When a passenger (not shown) is sitting in seat 12, the seat mechanism is deflected thereby engaging plunger mechanism 54 which acts to open switch 52.

Assuming first, that no passenger is present in seat 12, thus, switch mechanism 52 remains closed. When the ignition switch 60 of the vehicle is turned on by the driver, electrical current flows from the battery 30 through the ignition switch 60 and across terminals C and D of control mechanism 40 then through switch 52 to ground. This electrical current actuates a solenoid or other means within the control mechanism 40 to open the normally closed switch connecting terminals A and B within the control mechanism 40 and thereby interrupt the electrical signal path between the collision sensor 26 and the fluid supply valve 24. Thus, the control mechanism 40 and passenger detecting means 50 are effective to prevent actuation of the inflatable cushion occupant restraint system at the right front passenger position in the event that no passenger is sitting in the seating position protected by the particular inflatable cushion 28. The same situation would apply to an unrestrained child standing against the dashboard of the automotive vehicle. Thus, the instant invention prevents serious injury to the unrestrained child and unneeded and undesired inflation of the occupant restraint system when no right front passenger is present.

However, if a passenger is seated in seat 12 at the right front position, the weight of the passenger causes the seat to deflect thereby engaging the plunger mechanism 54. This opens the electrical switch 52 and interrupts the electrical circuit across terminals C and D of control mechanism 40. When the driver of the vehicle subsequently turns on the ignition switch 60, switch 52 remains in the open position, thereby preventing a flow of electrical current across terminals C and D of control mechanism 40 and permitting the normally closed switch across terminals A and B to remain in the closed position. Thus, if the vehicle is subsequently involved in a collision, the signal supplied by collision sensing mechanism 26 will pass from terminal A through control mechanism 40 to terminal B and actuate valve 24 to allow fluid from the reservoir 23 to inflate the cushion 28 and protect the passenger seated in the vehicle seat 12.

If a small child seated in the vehicle seat 12 stands up against the dash 16 to look out of the vehicle windshield as frequently happens, switch mechanism 52 will close and permit current to flow across terminals C and D of control mechanism 40. After a predetermined time delay, control mechanism 40 will open the circuit across terminals A and B, thereby rendering the inflatable cushion 28 at the right front passenger position inoperative and reducing the possibility of injury to the unrestrained child in the event of a collision.

It should be noted that a separate control mechanism and passenger detecting mechanism would be required for each occupant position protected by a restraint system except possibly the driver's position. This is because the driver's position is usually occupied during a collision.

I now claim:

1. Apparatus for use in a vehicle designed for transporting a plurality of passengers, said vehicle having a predetermined seating position for each of said passengers, a plurality of passenger restraint systems which are automatically actuatable upon receipt of a signal sent in response to said vehicle encountering a collision, each of said passenger seating positions being associated with a particular one of said automatically actuatable passenger restraint systems whereby movement of a passenger seated in a particular seating position will be restrained upon actuation of the restraint system associated therewith, and means for sensing the occurrence of a collision and for sending said signal, said apparatus comprising means associated with each of said seating positions for detecting the presence or absence of a passenger therein, and means responsive to said passenger detecting means for interrupting transmission of said signal to the restraint system associated with a particular seating position if no passenger is present in that seating position while permitting transmission of said signal to the restraint systems associated with seating positions where passengers are present.

2. The invention of claim 1 wherein the improvement further comprises a time delay mechanism operably associated with said means responsive to said passenger detecting means for delaying operation thereof for a predetermined time period after the absence of a passenger has been detected to thereby prevent interruption of said signal in the event that the passenger has only been momentarily jostled out of position by the effects of collision forces acting thereon.

3. The invention of claim 1 wherein said passenger detecting means comprises a normally closed switch for each seating position disposed to be opened by the weight of an occupant sitting in the vehicle seat.

4. The invention of claim 1 wherein said automatically actuatable passenger restraint systems each comprise an inflatable confinement having a collapsed inoperative condition and an expanded operative condition, means for expanding said confinement to the operative condition and electrically actuated valve means operable in response to receipt of said signal for actuating said means for expanding said confinement.

5. Apparatus for use in a vehicle designed for transporting a plurality of passengers, said vehicle having a predetermined seating position for each of said passengers, said apparatus comprising a plurality of passenger restraint systems adapted to be mounted in said vehicle in confronting relation to said predetermined seating positions, said restraint systems being automatically actuatable from an inoperative position to an operative position in response to said vehicle encountering a collision, each of said passenger seating positions being associated with at least one of said automatically actuatable passenger restraint systems whereby movement of a passenger seated in a particular seating position will be restrained upon actuation of the restraint system associated therewith, means disposed on said vehicle for sensing the occurrence of a collision and actuating said restraint systems, means associated with each of said seating positions for detecting the presence or absence of an occupant therein, and means responsive to said passenger detecting means for preventing actuation of the restraint system associated with a particular seating position if no passenger is present in that seating position while permitting actuation of the restraint systems associated with seating positions in which passengers are present whereby excessive damage to the vehicle interior may be eliminated and the unneeded restraint systems preserved in the inoperative position for future use.

6. The invention of claim 5 wherein the improvement comprises time delay means operably associated with said means for preventing actuation of said restraint system for delaying operation thereof for a predetermined time period after the absence of a passenger has been detected.

7. The invention of claim 5 wherein each of said restraint systems comprise an inflatable confinement having a collapsed inoperative position and an expanded operative position and fluid supply means actuatable for expanding said confinement to the operative position.

* * * * *